(12) United States Patent
Yamada et al.

(10) Patent No.: US 11,296,515 B2
(45) Date of Patent: Apr. 5, 2022

(54) STORAGE BATTERY UNIT

(71) Applicant: PANASONIC INTELLECTUAL PROPERTY MANAGEMENT CO., LTD., Osaka (JP)

(72) Inventors: Yohei Yamada, Hyogo (JP); Takeshi Nakashima, Hyogo (JP); Shoichi Toya, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 164 days.

(21) Appl. No.: 16/628,241

(22) PCT Filed: Jul. 3, 2018

(86) PCT No.: PCT/JP2018/025132
§ 371 (c)(1),
(2) Date: Jan. 2, 2020

(87) PCT Pub. No.: WO2019/009270
PCT Pub. Date: Jan. 10, 2019

(65) Prior Publication Data
US 2020/0412140 A1 Dec. 31, 2020

(30) Foreign Application Priority Data
Jul. 7, 2017 (JP) .............................. JP2017-133576

(51) Int. Cl.
*H02J 7/00* (2006.01)
*H02J 3/32* (2006.01)
(Continued)

(52) U.S. Cl.
CPC ............ *H02J 7/00036* (2020.01); *H02J 3/32* (2013.01); *H02J 3/381* (2013.01); *H02J 7/0013* (2013.01);
(Continued)

(58) Field of Classification Search
USPC ................................. 320/101, 102, 103, 104
See application file for complete search history.

(56) References Cited

U.S. PATENT DOCUMENTS

2011/0291606 A1* 12/2011 Lee .......................... H02J 7/025
320/101
2015/0015419 A1 1/2015 Halker et al.
(Continued)

FOREIGN PATENT DOCUMENTS

EP 2871744 A1 5/2015
JP 2013-240156 A 11/2013
(Continued)

OTHER PUBLICATIONS

Extended European Search Report dated Mar. 24, 2020 issued for the corresponding EP patent application No. 18827505.1.
(Continued)

*Primary Examiner* — Brian Ngo
(74) *Attorney, Agent, or Firm* — McDermott Will & Emery LLP (57) ABSTRACT

Storage battery unit is a storage battery unit which is connected to PCS. Storage battery unit includes: storage battery module that includes a plurality of electric cells; first terminal which is connectable to PCS, and capable of outputting electric power from storage battery module to PCS; and second terminal which is connectable to external device, and capable of outputting electric power from storage battery module to external device without passing through PCS.

3 Claims, 6 Drawing Sheets

(51) Int. Cl.
H02J 3/38 (2006.01)
H02J 7/35 (2006.01)
(52) U.S. Cl.
CPC ............... *H02J 7/0047* (2013.01); *H02J 7/35* (2013.01); *H02J 2300/24* (2020.01)

(56) References Cited

U.S. PATENT DOCUMENTS

| | | |
|---|---|---|
| 2015/0145476 A1 | 5/2015 | Toya |
| 2017/0001527 A1 | 1/2017 | Prokhorov |
| 2017/0101015 A1 | 4/2017 | Gaspard |

FOREIGN PATENT DOCUMENTS

| | | |
|---|---|---|
| JP | 2014-239619 A | 12/2014 |
| JP | 2015-233374 A | 12/2015 |
| WO | 2014/030348 A1 | 2/2014 |
| WO | 2014/199207 A1 | 12/2014 |

OTHER PUBLICATIONS

European Office Action dated Feb. 25, 2021 issued in corresponding European Patent Application No. 18827505.1.

International Search Report and Written Opinion dated Aug. 28, 2018 in International Application No. PCT/JP2018/025132; with partial English translation.

* cited by examiner

STORAGE BATTERY UNIT

CROSS-REFERENCE OF RELATED APPLICATIONS

This application is the U.S. National Phase under 35 U.S.C. § 371 of International Patent Application No. PCT/JP2018/025132, filed on Jul. 3, 2018, which in turn claims the benefit of Japanese Application No. 2017-133576, filed on Jul. 7, 2017, the entire disclosures of which Applications are incorporated by reference herein.

TECHNICAL FIELD

The present disclosure relates to a storage battery unit which is connected with a power conditioner.

BACKGROUND ART

Conventionally, there have been storage battery units which are charged with electric power supplied from, for example, system power sources and solar cells. For example, Patent Literature (PTL) 1 discloses the technology of a power supply device (storage battery unit) which stores energy generated by a solar cell in a storage battery, such as a lithium ion battery, and supplies electric power to electrical equipment. With this, it is possible to generate electric power even when power fails at the time when a disaster and the like occur.

CITATION LIST

Patent Literature

PTL 1: Japanese Unexamined Patent Application Publication No. 2013-240156

SUMMARY OF THE INVENTION

Technical Problem

A power conditioner is connected between an electric power source, such as a solar cell and a system power source, and a storage battery unit which stores electric power supplied from the solar cell, the system power source, and the like, for adjusting the amount of the electric power to be supplied. That is, the electric power stored in the storage battery unit is outputted via the power conditioner. For this reason, the electric power stored in the storage battery unit could not have been used without the power conditioner.

In view of the above, the present disclosure provides a storage battery unit that can appropriately supply electric power.

Solution to Problem

A storage battery unit according to an aspect of the present disclosure is a storage battery unit which is connected to a power conditioner, the storage battery unit includes: a storage battery module that includes a plurality of electric cells; a first terminal which is connectable to the power conditioner, and capable of outputting electric power from the storage battery module to the power conditioner; and a second terminal which is connectable to an external device, and capable of outputting electric power from the storage battery module to the external device without passing through the power conditioner.

Advantageous Effect of Invention

A storage battery unit according to the present disclosure can appropriately supply electric power.

DESCRIPTION OF EXEMPLARY EMBODIMENTS

Hereinafter, a storage battery unit according to embodiments will be described with reference to the drawings. Note that the embodiments described below each show a general or a specific example. The numerical values, shapes, materials, elements, the arrangement and the connection of the elements, steps, and the processing order of the steps, etc. presented in the embodiments below are mere examples, and thus are not intended to limit the present disclosure. Therefore, among the structural elements in the following embodiments, structural elements not recited in any one of the independent claims are described as optional structural elements.

Moreover, the drawings are schematic diagrams and do not necessarily provide strictly accurate illustrations. Throughout the drawings, the same numeral is given to substantially the same element, and redundant description may be omitted or simplified.

Embodiment 1

[Configuration of Storage Battery Unit]

Figure 1:
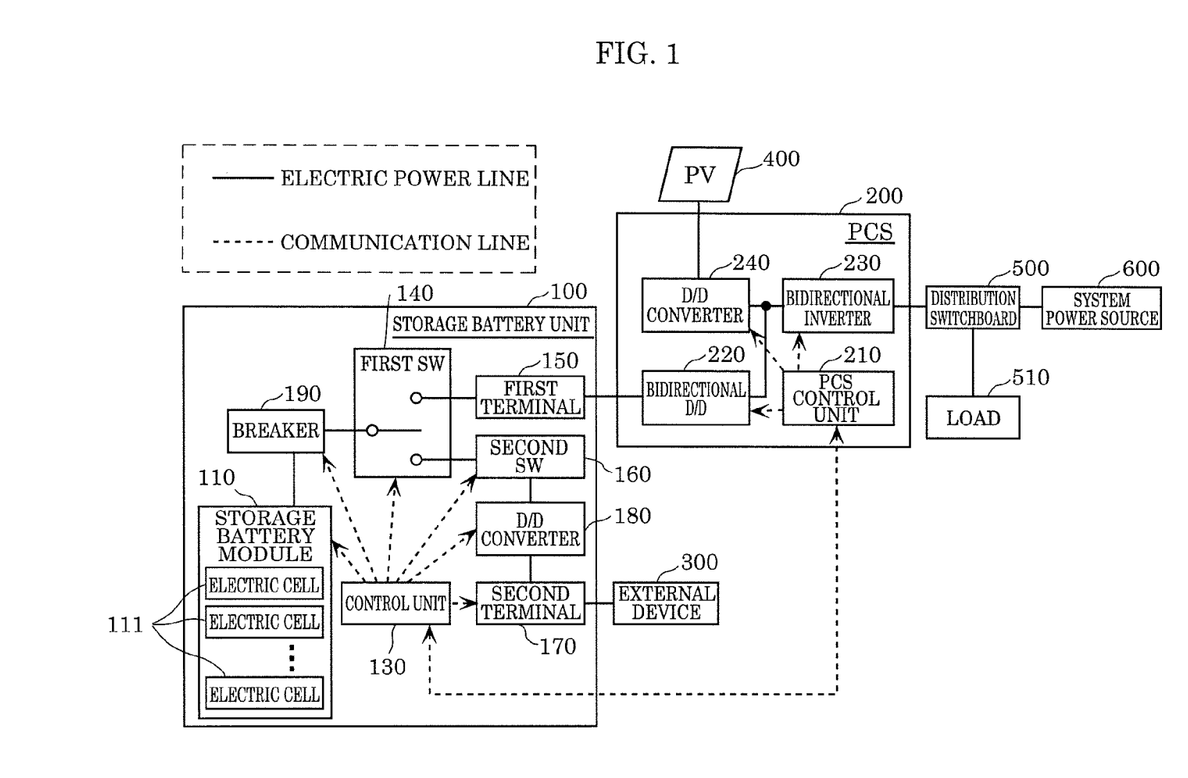
FIG. 1 is a block diagram illustrating a system that includes a storage battery unit according to Embodiment 1.

FIG. 1 is a block diagram illustrating a system that includes storage battery unit 100 according to Embodiment 1.

As illustrated in FIG. 1, storage battery unit 100 is an electric storage device which includes storage battery module 110. Storage battery unit 100 is connected with power conditioner (PCS) 200. Storage battery unit 100 is connected with, via PCS 200, system power source 600 which is an external commercial power source, photovoltaic cell (PV) 400, and the like. Storage battery module 110 stores (charged with) electric power supplied from system power source 600 and PV 400. The electric power stored in storage battery unit 100 can be supplied to load 510, such as a lighting apparatus and the like, in an institution via PCS 200 and distribution switchboard 500. Examples of the institution are a private home, a commercial building, such as an office building, and a public facility.

Storage battery unit 100 includes storage battery module 110, breaker 190, first SW 140, first terminal 150, second SW 160, D/D converter 180, second terminal 170, and control unit 130.

Storage battery module 110 includes a plurality of electric cells 111 which store electric power supplied from system power source 600 and photovoltaic cell (PV) 400. The plurality of electric cells 111 are battery cells, such as lithium ion batteries and lead storage batteries. The plurality of electric cells 111 may be connected in series, in parallel, or in a combination of series and parallel.

Breaker 190 is a breaker for cutting off the connection between storage battery module 110 and PCS 200, when an anomaly occurs in storage battery unit 100. Specifically, control unit 130 monitors each of structural elements in storage battery unit 100, and when control unit 130 determines that there is an anomaly in storage battery unit 100, operates breaker 190 to cut off the connection between storage battery module 110 and first terminal 150.

First SW 140 is a switch for switching a state of the connection between storage battery module 110 and first terminal 150, and between storage battery module 110 and second terminal 170.

First terminal 150 is a terminal for connecting storage battery unit 100 and PCS 200. Electric power from storage battery module 110 can be supplied to PCS 200 via first terminal 150.

Second SW 160 is a switch for switching on and off the output of electric power supplied from storage battery module 110 to second terminal 170. For example, second SW 160 is configured as a field effect transistor (FET).

D/D converter 180 is a device for controlling electric power which second terminal 170 outputs. For example, D/D converter 180 is a direct current (DC)/DC converter. Note that a DC/alternating current (AC) inverter may be used as D/D converter 180, instead of a DC/DC converter.

Second terminal 170 is a terminal for connecting storage battery unit 100 and external device 300 which is a load device, such as a lighting apparatus and a mobile phone. For example, second terminal 170 is a universal serial bus (USB) connecting terminal. DC electric power or AC electric power from storage battery module 110 can be supplied to external device 300 via second terminal 170.

As such, storage battery unit 100 is characterized by having (i) first terminal 150 which is capable of outputting electric power to PCS 200, and (ii) second terminal 170 which is capable of outputting electric power to external device 300 without passing through PCS 200.

Note that storage battery unit 100 may include a plurality of second terminals 170, a plurality of D/D converters 180, and a plurality of SWs 160.

Control unit 130 is a control device which obtains and/or monitors a state of each structural element included in storage battery unit 100, and sends, to PCS 200, information indicating the state of electric power storage in storage battery module 110, for example. Control unit 130 is realized by a central processing unit (CPU), and a control program stored in a storage device (not illustrated) that is realized by a read-only memory (ROM), a random-access memory (RAM), a hard disk drive (HDD), a flash memory, and the like. In addition, control unit 130 includes a wired or a wireless communication interface for communicating with PCS 200.

In addition, when a predetermined state is detected, control unit 130 may control second terminal 170 out of first terminal 150 and second terminal 170 such that electric power can be supplied from second terminal 170. Here, the predetermined state is a state in which the output of electric power to PCS 200 is determined to be discontinued. For example, in the predetermined state, when repeated communication between PCS 200 and control unit 130 is interrupted, a user operates an input device (not illustrated), such as a button or a touch panel, in storage battery unit 100 for executing an instruction for allowing the supply of electric power from second terminal 170. In addition, the predetermined state may be a state in which the user operates a communication terminal, such as a mobile phone, a controller for home energy management system (HEMS), and the like, to input an instruction to control unit 130 for allowing the supply of electric power from second terminal 170. Control unit 130 may control storage battery unit 100 using different operation modes before and after detecting these predetermined states described above. The control which control unit 130 performs will be described in detail later.

PCS 200 is a power conditioner which causes storage battery unit 100 to be charged with the electric power generated by PV 400 and the electric power supplied from system power source 600. Also, PCS 200 causes the electric power generated by PV 400 and electric power in storage battery unit 100 to be supplied to load 510 via distribution switchboard 500. PCS 200 includes PCS control unit 210, bidirectional D/D 220, bidirectional inverter 230, and D/D converter 240.

PCS control unit 210 is a control device which communicates with control unit 130. For example, PCS control unit 210 is realized by a CPU and a control program stored in a storage device (not illustrated) which is realized by a ROM, a RAM, an HDD, a flash memory, and the like. In addition, PCS control unit 210 includes a wired or wireless communication interface for communicating with storage battery unit 100.

Bidirectional D/D 220 is a DC/DC converter which controls the input and the output of electric power between storage battery unit 100 and PCS 200.

Bidirectional inverter 230 is a bidirectional DC/AC inverter which converts DC electric power inputted from PV 400 or storage battery unit 100 into AC electric power, and converts AC electric power inputted from system power source 600 into DC electric power.

D/D converter 240 is a DC/DC converter which controls the electric power value of the DC electric power which is inputted from PV 400.

[Control of Storage Battery Unit]

Next, the control on storage battery module 110 performed by control unit 130 and PCS control unit 210 for charging and discharging storage battery module 110 will be described in detail. As has been described above, control unit 130 controls storage battery module 110 in different operation modes before and after detecting a predetermined state. In the following, an operation mode that is performed before control unit 130 detects the predetermined state will be described as a first mode, and an operation mode that is performed after control unit 130 detects the predetermined state will be described as a second mode. Note that the operation of PCS control unit 210 will also be described, since PCS control unit 210 is involved in controlling the charge and the discharge of storage battery module 110 in the first mode.

<First Mode>

Control unit 130 repeatedly sends information on storage battery module 110 to PCS 200.

The information on storage battery module 110 includes a temperature of electric cell 111, for example. Control unit 130 measures a cell temperature of each of the plurality of electric cells 111, and sends information indicating cell temperatures to PCS control unit 210. PCS control unit 210 determines, based on the cell temperatures obtained from control unit 130, an allowable current value which is the upper limit of current values that storage battery module 110 inputs and outputs. PCS control unit 210 controls the charge and the discharge of storage battery module 110 by controlling, for example, bidirectional D/D 220, not to exceed the allowable current value.

Note that control unit 130 may send information indicating (i) a cell temperature of each of the plurality of electric cells 111, (ii) the maximum and the minimum cell temperatures, or (iii) the allowable current value described above which is calculated from the cell temperatures.

In addition, the information on storage battery module 110 includes a pressure value of electric cell 111, for example. Control unit 130 measures a cell voltage of each of the plurality of electric cells 111, and sends information indicating cell voltages to PCS control unit 210. PCS control unit 210 controls the charge and the discharge of storage battery module 110 by controlling, for example, bidirectional D/D 220 based on a predetermined voltage set value, and the cell temperatures and cell voltages which are obtained from control unit 130.

Note that control unit 130 may send information indicating a cell voltage of each of the plurality of electric cells 111, or the maximum and the minimum cell voltages. In addition, control unit 130 may send information indicating the state of storage battery module 110 being fully charged, and the state of storage battery module 110 being fully discharged, and a request for the discontinuation of charging and discharging battery module 110. PCS control unit 210 may control the charge and the discharge of storage battery module 110 based on such information.

In addition, the information on storage battery module 110 may include the state of charge (SOC) of storage battery module 110, for example. The SOC indicates the charging rate of storage battery module 110. Control unit 130 sends, to PCS control unit 210, information indicating current values inputted to and outputted from storage battery module 110, or SOC calculated by measuring the voltage values of storage battery module 110. PCS control unit 210 controls the charge and the discharge of storage battery module 110 by controlling, for example, bidirectional D/D 220 based on the SOC obtained from control unit 130. The method for determining the allowable range of the SOC is not limited. The allowable range of the SOC may be predetermined, or may be determined by user operation performed on an input device (not illustrated), such as a button or a touch panel, which PCS 200 includes. When the SOC obtained from control unit 130 goes out of the predetermined allowable range of SOC, PCS control unit 210 controls, for example, bidirectional D/D 220 to discontinue the charge and the discharge of storage battery module 110.

In addition, control unit 130 monitors storage battery module 110 for an anomaly. For example, when the overcharge or the overdischarge of storage battery module 110 due to a malfunction in PCS 200 is detected, control unit 130 operates breaker 190 and cuts off the connection between storage battery module 110 and first terminal 150.

<Second Mode>

Next, a second mode will be described. The second mode is the control which control unit 13 performs after detecting the predetermined state. In the second mode, control unit 130 controls the discharge of storage battery module 110 via second terminal 170.

Control unit 130 measures a cell temperature of each of the plurality of electric cells 111, and determines the allowable current value. The allowable current value is the upper limit of a current value which storage battery module 110 outputs. Control unit 130 controls the discharge of storage battery module 110 by controlling second SW 160 and D/D converter 180 not to exceed the allowable current value. For example, when a current value outputted from second terminal 170 exceeds the allowable current value, control unit 130 controls second SW 160 and D/D converter 180 to prevent or discontinue the discharge of storage battery module 110.

In addition, control unit 130 measures a cell voltage of each of the plurality of electric cells 111, and controls second SW 160 and D/D converter 180 based on the predetermined voltage set value to control storage battery module 110 to prevent or discontinue the discharge of storage battery module 110. Furthermore, control unit 130 measures a cell voltage of each of the plurality of electric cells 111, and controls breaker 190 based on the predetermined voltage set value to cut off the connection between storage battery module 110 and second terminal 170.

In addition, control unit 130 measures a current value outputted from storage battery module 110, or a voltage value of storage battery module 110 to calculate SOC. The method for determining the allowable range of SOC is not limited. The allowable range of SOC may be predetermined, or may be determined by user operation performed on an input device (not illustrated), such as a button or a touch panel, which PCS 200 includes. Control unit 130 controls second SW 160 and D/D converter 180 based on the SOC calculated and the allowable range of the SOC to control storage battery module 110 to prevent or discontinue the discharge of storage battery module 110. For example, when the SOC calculated goes out of the predetermined allowable range of the SOC, control unit 130 controls second SW 160 to discontinue the discharge of storage battery module 110 from second terminal 170. In addition, for example, when the SOC calculated goes out of the predetermined allowable range of the SOC, control unit 130 controls breaker 190 to cut off the connection between storage battery module 110 and second terminal 170.

In addition, control unit 130 monitors storage battery module 110 for an anomaly. For example, when the overdischarge of storage battery module 110 is detected, control unit 130 controls breaker 190 to cut off the connection between storage battery module 110 and second terminal 170.

Figure 2:
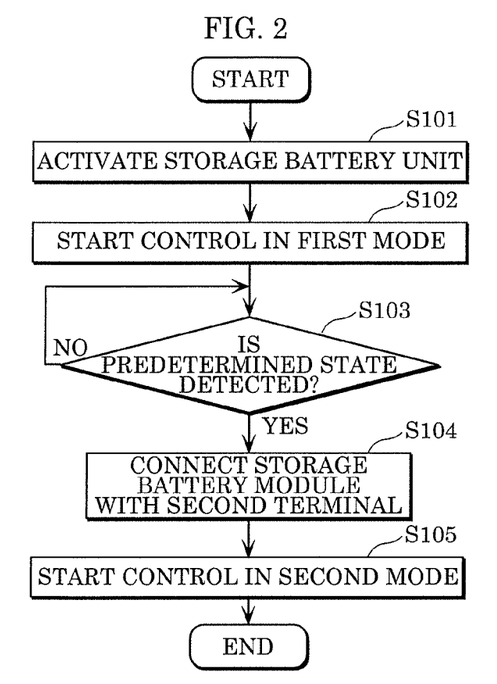
FIG. 2 is a flowchart illustrating a procedure performed by a control unit in the storage battery unit according to Embodiment 1, when the control unit changes an operation mode.

FIG. 2 is a flowchart illustrating a procedure performed by control unit 130 in storage battery unit 100 according to Embodiment 1, when control unit 130 changes an operation mode.

First, storage battery unit 100 is activated (step S101). Storage battery unit 100 may be activated by user operation performed on the input device described above which storage battery unit 100 includes, for example. In addition, storage battery unit 100 may include a timer (not illustrated), such as a real time clock (RTC), which measures time so that storage battery unit 100 is set to be activated at a predetermined time, for example. Furthermore, storage battery unit 100 may be activated when storage battery unit 100 obtains a signal from PCS 200.

Next, control unit 130 starts control in the first mode described above (step S102).

Next, control unit 130 determines whether a predetermined state is detected (step S103).

When the predetermined state is not detected (NO in step S103), control unit 130 continues with the operation described in step S103.

On the other hand, when the predetermined state is detected (YES in step S103), control unit 130 operates first SW 140 to cut off the connection between storage battery module 110 and first terminal 150, and to connect storage battery module 110 with second terminal 170 (step S104). By cutting off the connection between storage battery module 110 and first terminal 150 in step S104, it is possible to prevent the application of unnecessary voltage to first terminal 150. Consequently, it is possible to prevent, for example, a failure of storage battery unit 100 due to the application of unnecessary voltage to first terminal 150.

Next, control unit 130 starts control in the second mode described above (step S105). This makes it possible for control unit 130 to supply electric power to external device 300 that is connected with second terminal 170.

[Effects, Etc.]

As has been described above, storage battery unit 100 is connected to PCS 200, and includes: storage battery module 110 that includes a plurality of electric cells 111; and first terminal 150 which is connectable to PCS 200, and capable of outputting electric power from storage battery module 110 to PCS 200. In addition, storage battery unit 100 includes second terminal 170 which is connectable to external device 300, and capable of outputting electric power from storage battery module 110 to external device 300 without passing through PCS 200.

Since storage battery unit 100 includes second terminal 170, it is possible to use electric power stored in storage battery unit 100, without passing through PCS 200. For example, when PCS 200 ceases operating properly due to a malfunction in PCS 200, storage battery unit 100 can output the electric power stored in storage battery module 110 to external device 300 via second terminal 170. That is, with this configuration, storage battery unit 100 can appropriately supply electric power stored in storage battery module 110 to external device 300.

In addition, storage battery unit 100 may further include control unit 130 that detects a predetermined state described above. In the first state that is a state before control unit 130 detects the predetermined state, storage battery unit 100 may be configured such that only first terminal 150 out of first terminal 150 and second terminal 170 is capable of outputting electric power from storage battery module 110. In addition, in the second state that is a state after the control unit has detected the predetermined state, storage battery unit 100 may be configured such that second terminal 170 is capable of outputting electric power from storage battery module 110.

Detection of the predetermined state by control unit 130 allows storage battery unit 100 to control the output of electric power via terminal 170 at a desired timing. For example, in an emergency when a disaster occurs, the connection between storage battery unit 100 and PCS 200 is cut off so that storage battery unit 100 can be used at a desired location. With this configuration, it is possible to improve the usability of storage battery unit 100.

For example, control unit 130 sends information on storage battery module 110 to PCS 200 before detecting the predetermined state, and may control an output of electric power from storage battery module 110 via second terminal 170 after detecting the predetermined state.

With this, control unit 130 can control the output of electric power stored in storage battery module 110 without passing through PCS 200, after detecting the predetermined state. With this configuration, storage battery unit 100 can readily control the output of electric power via second terminal 170.

Variation of Embodiment 1

First SW 140 which storage battery unit 100 according to Embodiment 1 includes switches the connection of storage battery module 110 with one of first terminal 150 and second terminal 170. When control unit 130 performs to control in the second mode, the connection between storage battery module 110 and first terminal 150 need not be cut off.

Figure 3:
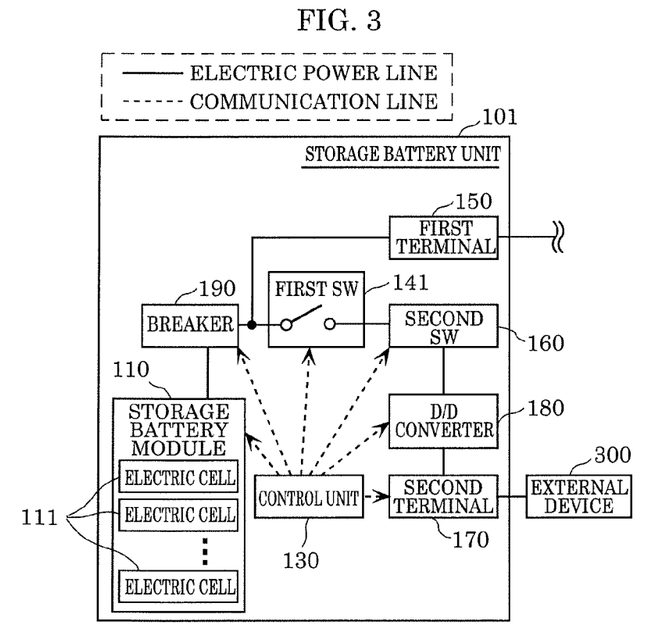
FIG. 3 is a block diagram illustrating a distinctive functional configuration of a storage battery unit according to Variation of Embodiment 1.

FIG. 3 is a block diagram illustrating a distinctive functional configuration of storage battery unit 101 according to Variation of Embodiment 1. Note that the same numeral is given to an element that is substantially the same element included in storage battery unit 100 according to Embodiment 1, and redundant description may be omitted or simplified.

As illustrated in FIG. 3, storage battery unit 101 includes a first SW that is different from the first SW in storage battery unit 100. Specifically, first SW 141 which storage battery unit 101 includes does not change the state of connection between storage battery module 110 and first terminal 150, and only changes the state of connection between storage battery module 110 and second terminal 170. Even with such a configuration, storage battery unit 101 can still produce the same effect as storage battery unit 100 produces.

Embodiment 2

Next, storage battery unit 102 according to Embodiment 2 will be described.

Figure 4:
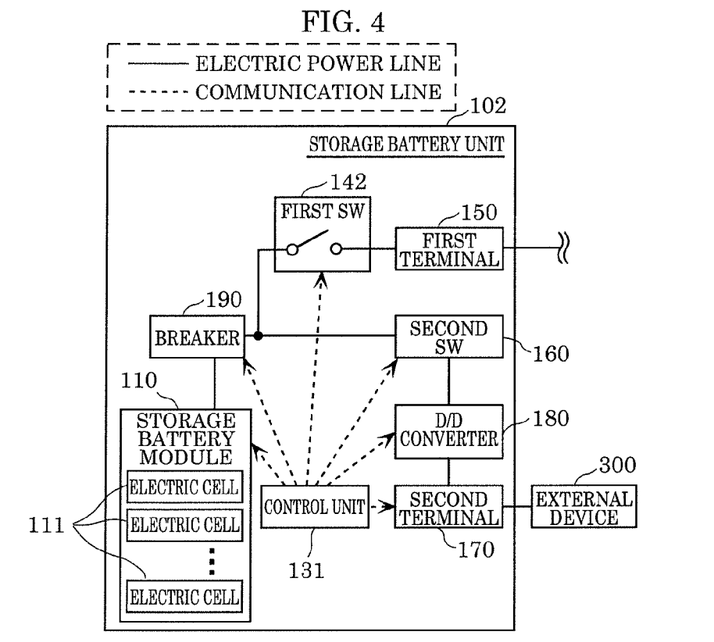
FIG. 4 is a block diagram illustrating a distinctive functional configuration of a storage battery unit according to Embodiment 2.

In storage battery unit 100 according to Embodiment 1, storage battery module 110 is connected with either first terminal 150 or second terminal 170. In storage battery unit 102 according to Embodiment 2, storage battery module 110 is connected with second terminal 170 all the time. In other words, storage battery unit 102 according to Embodiment 2 controls the discharge of storage battery unit 102 via second terminal 170, before detecting a predetermined state. The predetermined state is as described above in Embodiment 1. Note that the same numeral is given to an element that is substantially the same element included in storage battery unit 100 according to Embodiment 1, and redundant description may be omitted or simplified.

[Configuration of Storage Battery Unit]

FIG. 4 is a block diagram illustrating a distinctive functional configuration of storage battery unit 102 according to Embodiment 2. Like storage battery unit 100 according to Embodiment 1, storage battery unit 102 according to Embodiment 2 includes first terminal 150 which is connected with PCS 200, and control unit 131 is communicably connected to PCS 200 (specifically, PCS control unit 210), but the illustration of PCS 200 is omitted from FIG. 4.

As illustrated in FIG. 4, storage battery unit 102 according to Embodiment 2 is different from storage battery unit 100 according to Embodiment 1 in a state of the connection between storage battery module 110 and first terminal 150, and between storage battery module 110 and second terminal 170.

First SW 142 is a switch for switching a state of the connection between storage battery module 110 and first terminal 150.

In addition, storage battery module 110 is connected with second terminal 170 via second SW 160 and D/D converter 180, without passing through first SW 142. Note that, as described in Embodiment 1, D/D converter 180 is also an example in Embodiment 2. For example, a DC/DC converter or a DC/AC inverter may be used as D/D converter 180.

As described in Embodiment 1, control unit 131 is a control device which obtains and/or monitors a state of each of structural elements which storage battery unit 102 includes, and sends, to PCS 200, information indicating the state of electric power storage in storage battery module 110, for example. Control unit 131 is realized by a CPU, and a control program stored in a storage device (not illustrated) which is realized by a ROM, a RAM, an HDD, a flash memory, and the like. In addition, control unit 131 includes a wired or wireless communication interface for communicating with PCS 200.

In addition, control unit 131 controls the discharge of electric power stored in storage battery module 110 via second terminal 170. Details of control which control unit 131 performs differ before and after detecting a predetermined state.

[Control of Storage Battery Unit]

Next, the control on storage battery module 110 performed by control unit 131 and PCS control unit 210 for charging and discharging storage battery module 110 will be described in detail. As described above, the control which control unit 131 performs before and after detecting the predetermined state is different. In the following, an operation mode which control unit 131 performs before detecting the predetermined state is indicated as a third mode, and an operation mode which control unit 131 performs after detecting the predetermined state is indicated as a fourth mode. Note that the operation of PCS control unit 210 will also be described, since PCS control unit 210 is involved in the control for charging and discharging storage battery module 110 in the third mode.

<Third Mode>

In the third mode, storage battery unit 102 is configured such that electric power is capable of being outputted from both first terminal 150 and second terminal 170.

Control unit 131 repeatedly sends information on storage battery module 110 to PCS 200.

Information on storage battery module 110 includes a temperature of electric cell 111, for example. Control unit 131 measures a cell temperature of each of a plurality of electric cells 111, and sends information indicating cell temperatures to PCS control unit 210. PCS control unit 210 determines a first allowable current value which is the upper limit of a current value that storage battery module 110 outputs, based on the cell temperatures obtained from control unit 131. PCS control unit 210 sends information indicating the first allowable current value determined to control unit 131.

Note that control unit 131 may send information indicating a cell temperature of each of the plurality of electric cells 11, or the maximum and the minimum cell temperatures. Also, control unit 131 may calculate and send information indicating the first allowable current value which will be described later. When control unit 131 calculates the first allowable current value, PCS control unit 210 need not send information indicating the first allowable current value to control unit 131.

Control unit 131 determines a second allowable current value based on the first allowable current value obtained from PCS control unit 210. Specifically, control unit 131 determines the second allowable current value to be at most the first allowable current value. Control unit 131 controls, based on the second allowable current value, a supplying value of current which storage battery module 110 supplies via second terminal 170. For example, when a supplying value of current supplied to external device 300 which is connected with second terminal 170 exceeds the second allowable current value, control unit 131 controls second SW 160 and D/D converter 180 to prevent or discontinue the discharge of storage battery module 110 from second terminal 170. In addition, control unit 131 sends, to PCS control unit 210, information indicating the supplying value of current supplied to external device 300.

PCS control unit 210 controls the charge and the discharge of storage battery module 110 by controlling, for example, bidirectional D/D 220 not to exceed a value obtained by subtracting the supplying value of current supplied to external device 300 from the first allowable current value determined. The supplying value of current is obtained from control unit 131.

In addition, information on storage battery module 110 includes a voltage value of electric cell 111, for example. Control unit 131 measures a cell voltage of each of the plurality of electric cells 111, and sends information indicating cell voltages to PCS control unit 210. PCS control unit 210 controls, for example, bidirectional D/D 220 based on a predetermined voltage set value, and the cell temperatures and the cell voltages which are obtained from control unit 131 to control the charge and the discharge of storage battery module 110.

Note that control unit 131 may send information indicating a cell temperature of each of the plurality of electric cells 111, or the maximum and the minimum cell temperatures. In addition, control unit 131 may send information indicating the state of storage battery module 110 being fully charged, and the state of storage battery module 110 being fully discharged, and requesting request for the discontinuation of charging and discharging battery module 110. PCS control unit 210 may control the charge and the discharge of storage battery module 110, based on such information.

In addition, information on storage battery module 110 includes SOC of storage battery module 110, for example. Control unit 131 measures current values inputted to and outputted from storage battery module 110, or voltage values of storage battery module 110 to calculate SOC. Then, control unit 131 sends information indicating the SOC calculated to PCS control unit 210. PCS control unit 210 controls, for example, bidirectional D/D 220 based on the SOC obtained from control unit 131 and an allowable range (first allowable range) of the SOC to control the charge and the discharge of storage battery module 110. The method for determining the first allowable range of the SOC is not limited. The first allowable range of the SOC may be predetermined, or may be determined by user operation performed on the above-described input device which PCS 200 includes. When the SOC obtained from control unit 131 goes out of the predetermined first allowable range of the SOC, PCS control unit 210 controls, for example, bidirectional D/D 220 to discontinue the charge and the discharge of storage battery module 110. In addition, PCS control unit 210 sends information indicating the determined first allowable range of the SOC to control unit 131.

Control unit 131 determines a second allowable range of SOC based on the first allowable range of the SOC which is obtained from PCS control unit 210. Specifically, control unit 131 determines the lower limit of the second allowable range to be at least the lower limit of the first allowable range. Control unit 131 controls a supplying value of electric power which storage battery module 110 supplies via second terminal 170, based on the second allowable range. For example, when the SOC of storage battery module 110 goes out of the second allowable range due to the supply of electric power to external device 300 which is connected with second terminal 170, control unit 131 controls second SW 160 and D/D converter 180 to discontinue the discharge of storage battery module 110 from second terminal 170. Note that the upper limit of the second allowable range may be optionally determined.

In addition, control unit 131 monitors storage battery module 110 for an anomaly. For example, when the overcharge or the overdischarge of storage battery module 110 due to a malfunction in PCS 200 is detected, control unit 131 controls breaker 190 to cut off the connection between storage battery module 110 and first terminal 150.

<Fourth Mode>

Next, a fourth mode will be described. The fourth mode is a control which control unit 131 performs after detecting the predetermined state. In the fourth mode, storage battery unit 102 is configured such that electric power is capable of being outputted from second terminal 170.

Control unit 131 measures a cell temperature of each of the plurality of electric cells 111 and a supplying value of current supplied to external device 300. Control unit 131 determines a third allowable current value which is the upper limit of a current value that storage battery module 110 outputs, based on cell temperatures of the plurality of electric cell 111, for example. Control unit 131 controls second SW 160 and D/D converter 180 not to exceed the third allowable current value to control the discharge of storage battery module 110. For example, when a current value outputted from second terminal 170 exceeds the third allowable current value, control unit 131 controls second SW 160 and D/D converter 180 to prevent or discontinue the discharge of storage battery module 110.

Note that the second allowable current value determined in the third mode, and the third allowable current value determined in the fourth mode may be the same value or different values.

In addition, control unit 131 measures a cell voltage of each of the plurality of electric cells 111, and controls second SW 160 and D/D converter 180 based on a predetermined voltage set value to prevent or discontinue the discharge of storage battery unit 110. Furthermore, control unit 131 measures cell voltages of the plurality of the plurality of electric cells 111, and controls breaker 190 based on the predetermined voltage set value to cut off the connection between storage battery module 110 and second terminal 170.

In addition, control unit 131 measures a current value outputted from storage battery module 110, or a voltage value of storage battery module 110 to calculate SOC. The method for determining the third allowable range of SOC is not limited. The third allowable range of the SOC may be predetermined, or may be determined by user operation performed on the above-described input device which storage battery unit 102 includes. Control unit 131 controls second SW 160 and D/D converter 180 based on the calculated third allowable range of SOC to discontinue the discharge of storage battery module 110. For example, when the calculated SOC goes out of the predetermined third allowable range, control unit 131 controls second SW 160 to discontinue the discharge of storage battery module 110 from second terminal 170. In addition when the calculated SOC goes out of the predetermined third allowable range, control unit 131 controls breaker 190 to cut off the connection between storage battery module 110 and second terminal 170, for example.

Note that the second allowable range determined in the third mode, and the third allowable range determined in the fourth mode may be the same range or different ranges. For example, control unit 131 may determine the lower limit of the second allowable range of SOC to be at most 30%, and the lower limit of the third allowable range of SOC to be at most 0%.

In addition, control unit 131 monitors storage battery module 110 for an anomaly. For example, when the overdischarge of storage battery module 110 is detected, control unit 131 controls breaker 190 to cut off the connection between storage battery module 110 and second terminal 170.

Figure 5:
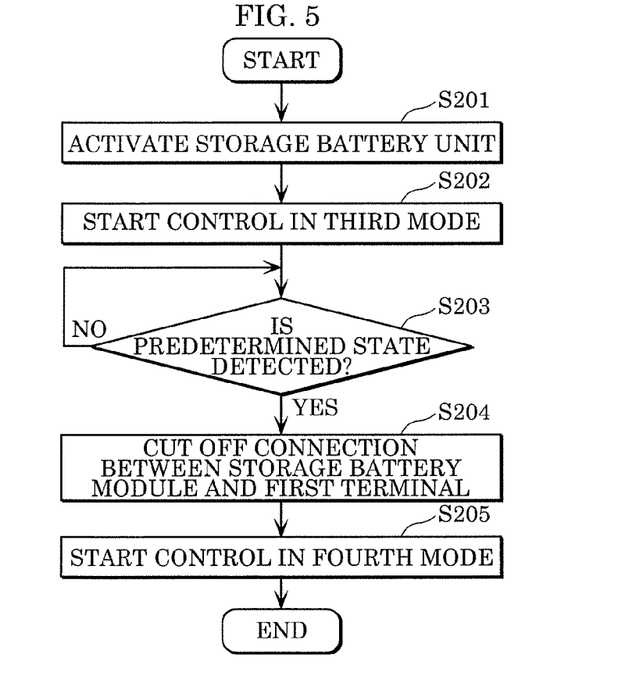
FIG. 5 is a flowchart illustrating a procedure performed by a control unit in the storage battery unit according to Embodiment 2, when the control unit changes an operation mode.

FIG. 5 is a flowchart illustrating a procedure performed by control unit 102 in storage battery unit 131 according to Embodiment 2, when the control unit changes an operation mode.

First, storage battery unit 102 is activated (step S201). Storage battery unit 102 may be activated by user operation performed on the above-described input device which storage battery unit 102 includes, for example. In addition, storage battery unit 102 may include a timer, such as an RTC, which measures time so that storage battery unit 102 is set to be activated at a predetermined time, for example. Furthermore, storage battery unit 102 may be activated when storage battery unit 102 obtains a signal from PCS 200.

Next, control unit 131 starts control in the third mode described above (step S202).

Next, control unit 131 determines whether a predetermined state is detected (step S203).

When the predetermined state is not detected (NO in step S203), control unit 131 continues with the operation described in step S203.

On the other hand, when the predetermined state is detected (YES in step S203), control unit 131 operates first SW 142 to cut off the connection between storage battery module 110 and first terminal 150 (step S204). By cutting off the connection between storage battery module 110 and first terminal 150 in step S204, it is possible to prevent the application of unnecessary voltage to first terminal 150. Consequently, it is possible to prevent, for example, a failure of storage battery unit 102 due to the application of unnecessary voltage to first terminal 150.

Next, control unit 131 starts control in the fourth mode described above (step S205). This makes it possible for control unit 131 to appropriately supply electric power to external device 300 that is connected with second terminal 170, according to the detected predetermined state.

[Effects, Etc.]

Like storage battery unit 100 according to Embodiment 1, storage battery unit 102 according to Embodiment 2 also includes second terminal 170 as has been described above. This allows the use of electric power stored in storage battery unit 100, without passing through PCS 200. For example, even if PCS 200 ceases operating properly due to a malfunction in PCS 200, storage battery unit 102 can output electric power stored in storage battery module 110 to external device 300 via second terminal 170. That is, with this configuration, storage battery unit 102 can appropriately supply electric power stored in storage battery module 110 to external device 300.

In addition, storage battery unit 102 may further include control unit 131 that detects a predetermined state described above. Before control unit 131 detects the predetermined state, first terminal 150 and second terminal 170 may be capable of outputting electric power from storage battery module 110. Furthermore, after control unit 131 has detected the predetermined state, second terminal 170 may be capable of outputting electric power from storage battery module 110.

With this, storage battery unit 102 can suitably control the output of electric power in storage battery 100 via second terminal 170, even after control unit 131 detects the predetermined state. With this configuration, it is possible to improve the usability of storage battery unit 102.

For example, control unit 131 may send information on storage battery module 110 to PCS 200, and control the output of electric power from storage battery module 110 via second terminal 170, before detecting the predetermined state. In addition, control unit 131 may control the output of electric power from storage battery module 110 via second terminal 170, after detecting the predetermined state.

With this, control unit 131 can suitably control, depending on conditions, the output of electric power in storage battery module 110 via second terminal 170. Thus, with this configuration, storage battery unit 102 can readily and suitably control the output of electric power via second terminal 170.

Variation 1 of Embodiment 2

First SW 142 which storage battery unit 102 according to Embodiment 2 includes switches the connection between storage battery module 110 and first terminal 150.

Figure 6:
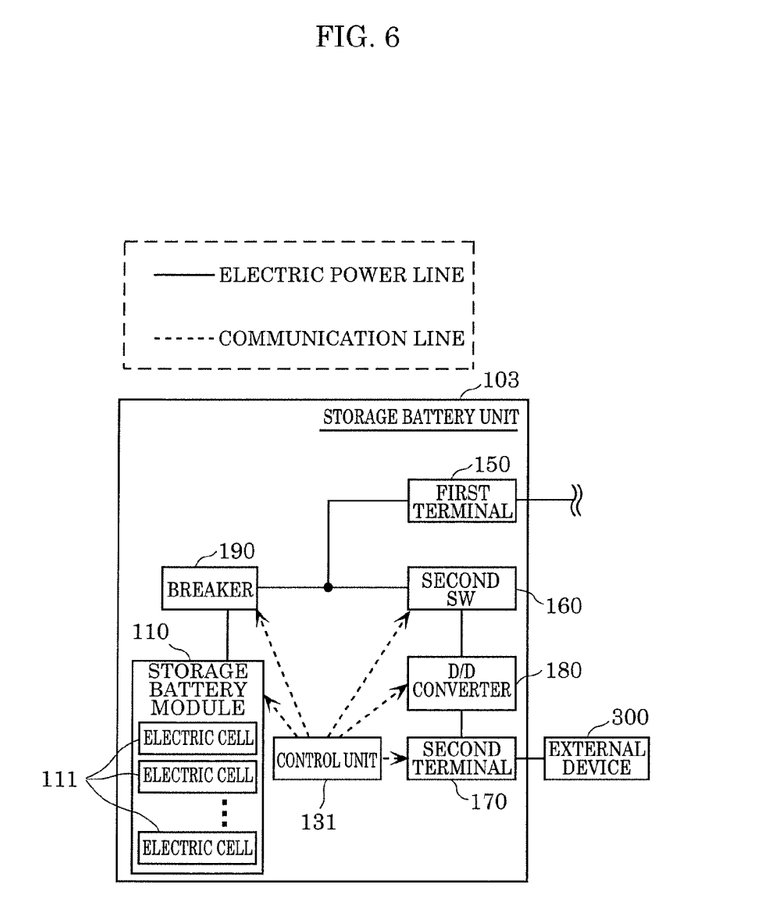
FIG. 6 is a block diagram illustrating a distinctive functional configuration of a storage battery unit according to Variation 1 of Embodiment 2.

FIG. 6 is a block diagram illustrating a distinctive functional configuration of storage battery unit 103 according to Variation 1 of Embodiment 2. Note that the same numeral is given to an element that is substantially the same element included in storage battery unit 102 according to Embodiment 2, and redundant description may be omitted or simplified.

Unlike storage battery unit 102, storage battery unit 103 does not include first SW 142 as illustrated in FIG. 6. Specifically, in storage battery unit 103, storage battery module 110 is connected with first terminal 150 all the time. Even with such a configuration, storage battery unit 103 can still produce the same effect as storage battery unit 102 produces.

Variation 2 of Embodiment 2

Storage battery unit 102 according to Embodiment 2 includes second SW 160, D/D converter 180, and second terminal 170. Storage battery unit 102 may include a plurality of second SWs, a plurality of D/D converters, and a plurality of second terminals.

Figure 7:
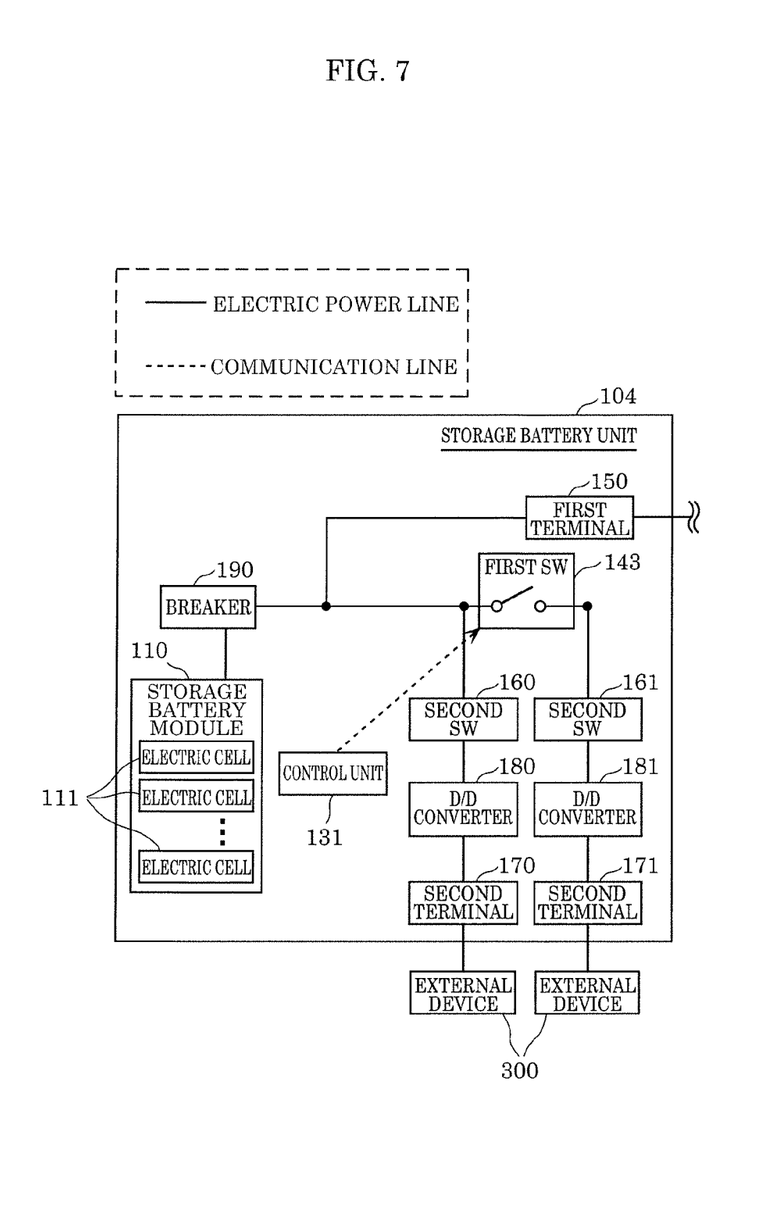
FIG. 7 is a block diagram illustrating a distinctive functional configuration of a storage battery unit according to Variation 2 of Embodiment 2.

FIG. 7 is a block diagram illustrating a distinctive functional configuration of storage battery unit 104 according to Variation 2 of Embodiment 2. Note that the same numeral is given to an element that is substantially the same element included in storage battery unit 102 according to Embodiment 2, and redundant description may be omitted or simplified.

As illustrated in FIG. 7, storage battery unit 104 has a configuration in which second SW 161, D/D converter 181, and second terminal 171 are further included in addition to the configuration of storage battery unit 102. Second SW 161, D/D converter 181, and second terminal 171 are substantially the same as second SW 160, D/D converter 180, and second terminal 170, respectively. As such, storage battery unit 104 includes a plurality of second SWs, a plurality of D/D converters, and a plurality of second terminals. With this, storage battery unit 104 can simultaneously supply electric power to a plurality of external devices 300. Note that a DC/DC converter or a DC/AC inverter may be used as D/D converter 181. In addition, for example, a DC/DC converter may be used as D/D converter 180, and a DC/AC inverter may be used as D/D converter 181.

In addition, storage battery unit 104 includes first SW 143.

First SW 143 is a switch which switches the state of connection between storage battery module 110 and second terminal 171. Specifically, control unit 131 controls first SW 143 to cause first SW 143 to switch the state of connection between storage battery module 110 and second terminal 171. For example, when a predetermined state is detected, control unit 131 controls first SW 143 to connect storage battery module 110 with second terminal 171. With this configuration, storage battery unit 104 can increase the number of terminals which can supply electric power to a plurality of external devices 300 depending on conditions.

Other Embodiment

Although the above has described storage battery units according to Embodiment 1, Variation of Embodiment 1, Embodiment 2, Variation 1 of Embodiment 2, and Variation 2 of Embodiment 2, the present disclosure is not limited to the embodiments described above.

For example, the storage battery units may be configured such that the storage battery units are capable of controlling electric power in storage battery module 110 which is outputted from the first terminal that is connected with PCS 200.

Figure 8:
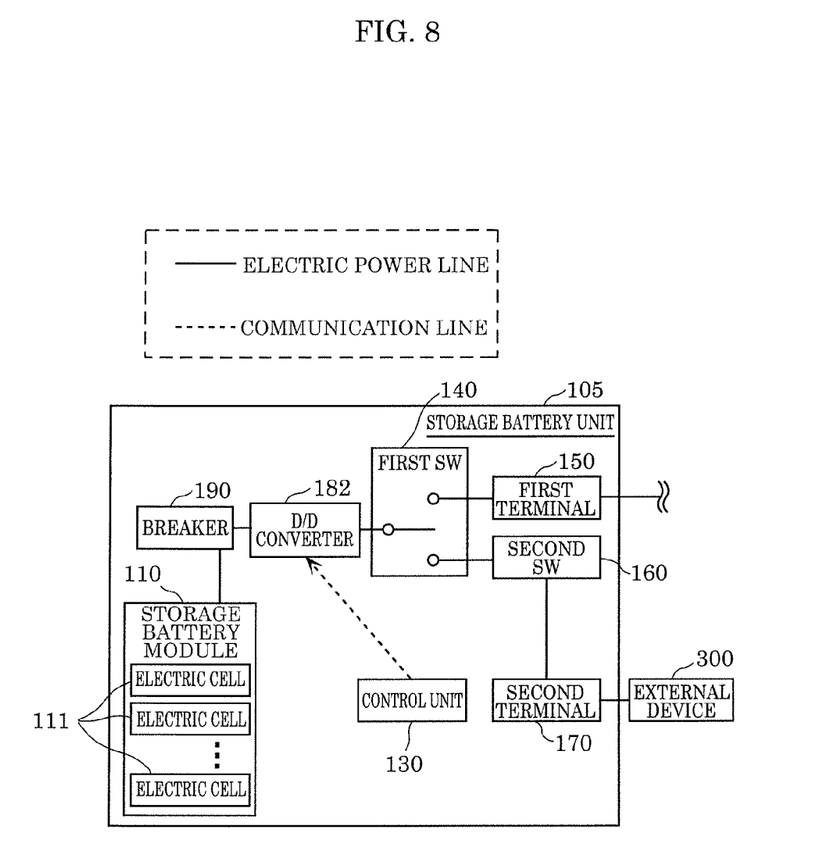
FIG. 8 is a block diagram illustrating a distinctive functional configuration of a storage battery unit according to Other Embodiment.

FIG. 8 is a block diagram illustrating a distinctive functional configuration of a storage battery unit according to Other Embodiment. Note that the same numeral is given to an element that is substantially the same element included in storage battery unit 100 according to Embodiment 1, and redundant description may be omitted or simplified.

As illustrated in FIG. 8, storage battery unit 105 has a configuration in which D/D converter 182 is further included in addition to the configuration of storage battery unit 100.

D/D converter 182 is a DC/DC converter which controls electric power outputted from storage battery module 110. One end of D/D converter 182 is connected with storage battery module 110, and the other end is connected with first SW 140. For example, when a predetermined state is detected, control unit 130 changes the value of a voltage converted by D/D converter 182, after switching first SW 140 from being connected with first terminal 150 to second terminal 170. Then, control unit 130 controls second SW 160 so that electric power stored in storage battery module 110 is capable of being outputted from second terminal 170. In this way, it is possible to prevent different voltages being applied to second terminal 170. Note that, for example, a DC/DC converter or a DC/AC inverter may be used as D/D converter 182 according to the embodiment.

In addition, the embodiments described above are realized by a processor executing a program, for example. However, the embodiments described above may be realized by a dedicated electric circuit using a gate array etc.

In addition, first SW 141 and second SW 160 in storage battery unit 101 according to Embodiment 2 may be realized as a single switch.

Furthermore, the structural elements which each storage battery unit includes may be arranged in a single housing, or may be arranged separately in a plurality of housings which are electrically connected with one another such that a control unit is capable of controlling each of the structural elements. That is, each storage battery unit may be a storage battery system in which the structural elements that each storage battery unit includes may be arranged in different housings.

In addition, the power conditioner (PCS 200) which is connected to each storage battery unit needs not include bidirectional inverter 230 and D/D converter 240. That is, PCS 200 only needs to include PCS control unit 210 and bidirectional D/D 220. PCS 200 may only have a function of converting electric power outputted from each storage battery unit and electric power inputted in each storage battery unit.

The present disclosure also encompasses: embodiments achieved by applying various modifications conceivable to those skilled in the art to each embodiment; and embodiments achieved by optionally combining the structural elements and the functions of each embodiment without departing from the essence of the present disclosure.

The invention claimed is:

1. A storage battery unit which is connected to a power conditioner, the storage battery unit comprising:
a storage battery module that includes a plurality of electric cells;
a first terminal which is connectable to the power conditioner, and capable of outputting electric power from the storage battery module to the power conditioner;
a second terminal which is connectable to an external device, and capable of outputting electric power from the storage battery module to the external device without passing through the power conditioner;
a control unit that detects a predetermined state, wherein
in a first state, only the first terminal out of the first terminal and the second terminal is capable of outputting electric power from the storage battery module, the first state being a state before the control unit detects the predetermined state, and
in a second state, the second terminal is capable of outputting electric power from the storage battery module, the second state being a state after the control unit has detected the predetermined state.

2. The storage battery unit according to claim 1, wherein the control unit:
sends information on the storage battery module to the power conditioner before detecting the predetermined state; and
controls an output of electric power from the storage battery module via the second terminal after detecting the predetermined state.

3. The storage battery unit according to claim 1, wherein in the second state, only the second terminal is capable of outputting electric power from the storage battery module.

* * * * *